United States Patent [19]

Bogdanovic

[11] Patent Number: 5,199,972
[45] Date of Patent: *Apr. 6, 1993

[54] METHOD OF PREPARING ACTIVE MAGNESIUM-HYDRIDE OR MAGNESIUM HYDROGEN-STORER SYSTEMS

[75] Inventor: Borislav Bogdanovic, Mülheim/Ruhr, Fed. Rep. of Germany

[73] Assignee: Studiengesellschaft Kohle G.m.b.H., Mulheim/Ruhr, Fed. Rep. of Germany

[*] Notice: The portion of the term of this patent subsequent to Nov. 19, 2002 has been disclaimed.

[21] Appl. No.: 517,001

[22] Filed: Apr. 30, 1990

Related U.S. Application Data

[60] Division of Ser. No. 423,292, Oct. 18, 1989, abandoned, which is a continuation of Ser. No. 782,605, Sep. 30, 1985, abandoned, which is a continuation of Ser. No. 548,055, Nov. 2, 1983, abandoned, which is a continuation-in-part of Ser. No. 500,070, Jun. 1, 1983, Pat. No. 4,554,152.

[30] Foreign Application Priority Data

Dec. 22, 1982 [DE] Fed. Rep. of Germany ....... 3247360

[51] Int. Cl.$^5$ .............................. B22F 1/00; C01B 6/24
[52] U.S. Cl. ....................................... 75/255; 420/402; 420/900; 423/658.2
[58] Field of Search ........................... 423/647, 658.2; 420/402, 900; 75/255

[56] References Cited

U.S. PATENT DOCUMENTS

| 3,030,184 | 4/1962 | Faust et al. | 423/647 |
| 3,479,165 | 11/1969 | Lyon | 423/647 |
| 3,485,585 | 12/1969 | Snyder | 423/647 |
| 3,617,218 | 11/1971 | Tamelena et al. | 423/647 |
| 4,200,623 | 4/1980 | Muller et al. | 423/647 |
| 4,200,624 | 4/1980 | Muller et al. | 423/647 |
| 4,389,326 | 6/1983 | Tangnay et al. | 423/647 |
| 4,554,153 | 11/1985 | Bogdonovic | 423/647 |
| 4,695,446 | 9/1987 | Bogdanovic | 423/647 |
| 4,798,718 | 1/1989 | Bogdanovic | 423/647 |
| 4,957,727 | 9/1990 | Bogdonovic | 423/647 |

FOREIGN PATENT DOCUMENTS

2804445 8/1979 Fed. Rep. of Germany ...... 423/647

OTHER PUBLICATIONS

Ashby et al., "J. of Amer. Chem. Soc.", vol. 99, 1977, pp. 310–311.

*Primary Examiner*—Gary P. Straub
*Assistant Examiner*—Steven Bos
*Attorney, Agent, or Firm*—Sprung Horn Kramer & Woods

[57] ABSTRACT

A method of preparing an active magnesium-hydride or magnesium hydrogen-storer system which can reversibly take up $H_2$, comprising contacting finely divided magnesium hydride or metallic magnesium with a solution of a metal complex or of a metal-organic compound of a transition metal of Subgroups IV-VIII of the periodic table, and then removing the solution. The product performs better with regard to speed and efficiency upon repeated hydrogenation and dehydrogenation, as in hydrogen storage and evolution.

4 Claims, 5 Drawing Sheets

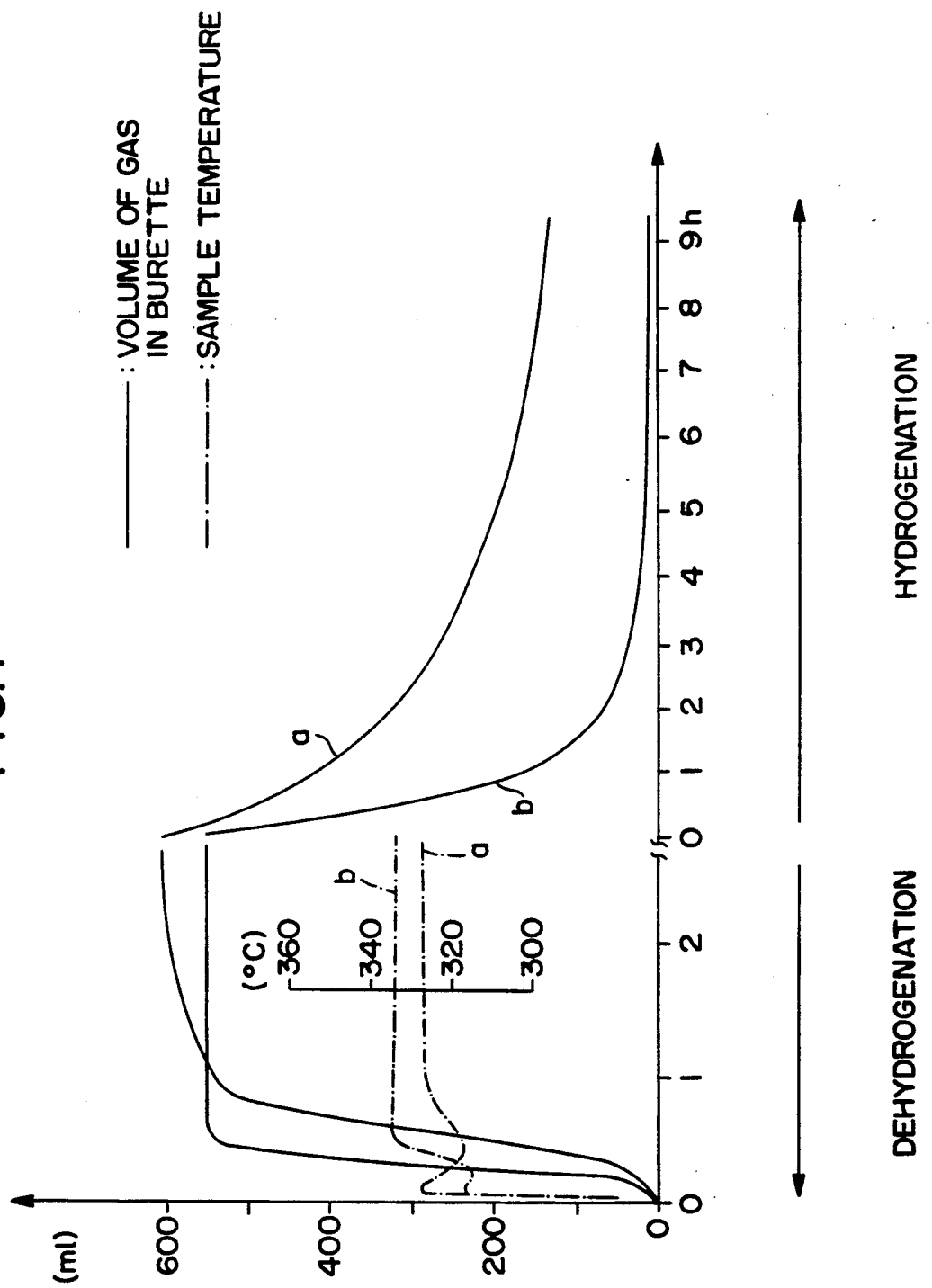

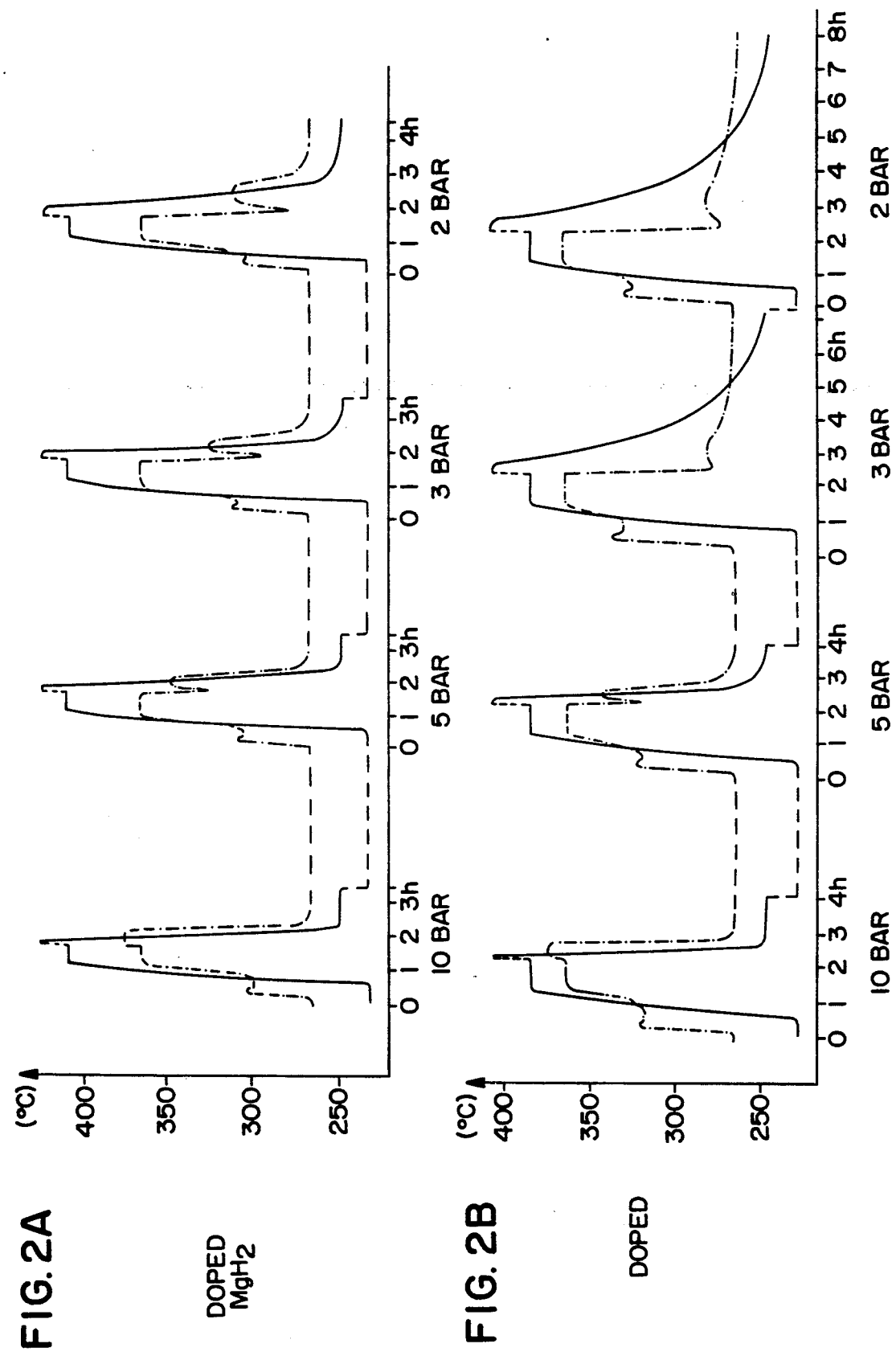

METHOD OF PREPARING ACTIVE MAGNESIUM-HYDRIDE OR MAGNESIUM HYDROGEN-STORER SYSTEMS

This is a division of application Ser. No. 423,292, filed Oct. 18, 1989, now abandoned, which is a continuation of application Ser. No. 782,605, filed Sep. 30, 1985, now abandoned, which is a continuation of application Ser. No. 548,055, filed Nov. 2, 1983, now abandoned which is a continuation-in-part of application Ser. No. 500,070, filed Jun. 1, 1983, now U.S. Pat. No. 4,554,152.

The present invention concerns a method of preparing magnesium-hydride or magnesium systems ($MgH_2$-Mg systems) that can be employed as reversible hydrogen-storage systems.

The $MgH_2$-Mg system is the most appropriate of all known metal-hydride and metal systems that can be used as reversible hydrogen-storage systems because it has the highest percentage by weight (7.65% by weight) of reversibly bound hydrogen and hence the highest energy density (2332 Wh/kg; Reilly & Sandrock, *Spektrum der Wissenschaft*, April 1980, 53) per unit of storer.

Although this property and the relatively low price of magnesium make the $MgH_2$-Mg seem the optimum hydrogen storer system for transportation, for hydrogen-powered vehicles that is, its unsatisfactory kinetics have prevented it from being used up to the present time. It is known for instance that pure magnesium can be hydrogenated only under drastic conditions, and then only very slowly and imcompletely. The dehydrogenation rate of the resulting hydride is also unacceptable for a hydrogen storer (Genossar & Rudman, *Z. f. Phys. Chem., Neue Folge* 116, 215 [1979], and the literature cited therein).

Intensive efforts have been devoted in recent years to improve the hydrogenability of magnesium by doping or alloying it with such individual foreign metals as aluminum (Douglass, *Metall. Trans.* 6a, 2179 [1975]) indium (Mintz, Gavra, & Hadari, *J. Inorg. Nucl. Chem.* 40, 765 [1978]), or iron (Welter & Rudman, *Scripta Metallurgica* 16, 285 [1982]), with various foreign metals (German *Offenlegungsschriften* 2 846 672 and 2 846 673), or with intermetallic compounds like $Mg_2Ni$ or $Mg_2Cu$ (Wiswall, *Top Appl. Phys.* 29, 201 [1978] and Genossar & Rudman, op. cit.) and $LaNi_5$ (Tanguy et al., *Mater. Res. Bull.* 11, 1441 [1976]).

Although these attempts did improve the kinetics, certain essential disadvantages have not yet been eliminated from the resulting systems. The preliminary hydrogenation of magnesium doped with a foreign metal or intermetallic compound still demands drastic reaction conditions, and the system kinetics will be satisfactory and the reversible hydrogen content high only after several cycles of hydrogenation and dehydrogenation. Considerable percentages of foreign metal or of expensive intermetallic compound are also necessary to improve kinetic properties. Furthermore, the storage capacity of such systems are generally far below what would theoretically be expected for $MgH_2$.

A considerable advance with respect to the kinetics of $MgH_2$-Mg systems is a method, specified in European Patent 0 003 564, for the homogeneously catalytic hydrogenation of magnesium in which the magnesium is converted with hydrogen in the presence of a catalyst consisting of a halide of a metal of Subgroups IV-VIII of the periodic table and of a magnesium-organic compound or magnesium hydride, in the presence if necessary of a polycyclic aromatic or tertiary amine, and in the presence if necessary of a magnesium halide $MgX_2$ in which X=Cl, Br, or I.

The main advantage of this method, aside from the mild reaction conditions accompanying the preliminary hydrogenation of the magnesium, is the superior kinetics of the resulting system with respect to the subsequent cycles of dehydrogenation and hydrogenation. The magnesium can accordingly be charged with hydrogen during the subsequent dehydrogenation and hydrogenation cycles either without pressure or under only slightly increased pressure and at lower temperatures than with known systems of this type (with the Mg-$Mg_2Ni$ system for instance). The storage capacity of an $MgH_2$-Mg system obtained by homogeneous catalysis is also in the vicinity of the theoretical level.

Now, a new process that effectively improves the kinetics of $MgH_2$-Mg hydrogen-storer systems has, surprisingly, been discovered.

The process in accordance with the invention consists of doping a finely divided form of the magnesium hydride or metallic magnesium by exposing it to (a) a solution of an appropriate transition-metal complex, (b) to a solution of an appropriate transition-metal organic compound or (c) transition metal per se in finely divided form. An extremely fine distribution of the particular transition metal precipitates over the surface of the particles of magnesium hydride or magnesium and assumes the function of catalyst in the dehydrogenation and hydrogenation cycles.

One particular advantage of the method in accordance with the invention is that even slight amounts of the precipitated transition metal provoke a powerful catalytic effect either immediately or subsequent to only a few cycles of dehydrogenation and hydrogenation and that this effect is maintained as the cycles continue. When on the other hand nickel is electrolytically deposited on magnesium (Eisenberg, Zagnoli, & Sheriden, *Journ. Less Common Metals* 74 323 [1980]) for example, its catalytic effect will decrease precipitously after only a few cycles. Another advantage is that even though only 0.05 to 4% by weight of the particular transition metal in terms of the magnesium hydride or magnesium is generally enough to obtain the desired catalytic effect, the $H_2$-storage capacity of the resulting system will be relatively high.

The elements of Subgroups IV-VII of the periodic table—titanium, vanadium, chromium, molybdenum, tungsten, iron, ruthenium, cobalt, rhodium, iridium, nickel, palladium, and platinum—are all appropriate transition metals.

Complexes or metal-organic compounds of nickel, palladium, and iron are preferred transition-metal complexes or transition-metal organic compounds for one method in accordance with the invention. Especially preferred are bis-(1,5-cyclooctadiene)-nickel ($COD_2Ni$), bis-($\eta^3$-allyl)-nickel, bis-(acetylacetonato)-nickel, bis-(ethylato)-nickel, phosphane-nickel complexes, and tetracarbonylnickel. When the transition metals palladium and iron are employed as dopes, they are preferably added in $\eta^3$-allyl, $\eta^5$-cyclopentadienyl, olefin, phosphane, acetylacetonato, or carbonyl complexes. Complexes or metal-organic compounds of platinum, cobalt, rhodium, iridium iron, ruthenium, chromium, molybdenum, tungsten, titanium, and vanadium can however also be employed to dope the magnesium or magnesium hydride.

Magnesium hydride obtained by homogeneous catalysis as specified in the above-mentioned European Patent 0 003 564 (in which the magnesium is converted with hydrogen in the presence of a catalyst consisting of a halide of a metal of Subgroups IV–VIII of the periodic table and of a magnesium-organic compound or magnesium hydride, in the presence if necessary of a polycyclic aromatic or tertiary amine, and in the presence if necessary of a magnesium halide $MgX_2$ which $X=Cl$, Br, or I) is especially appropriate for doping in accordance with the present invention.

Commercially available magnesium hydride with kinetic properties made appropriate for dehydrogenation and hydrogenation by doping it with a transition metal like nickel (Ex. 9) for instance in accordance with the invention can however also be employed.

The material can be doped in accordance with the invention in an aliphatic, cycloaliphatic, or aromatic hydrocarbon or in an aliphatic, cycloaliphatic, or aromatic ether like, for example, tetrahydrofuran (THF) in which the particular transition-metal complex or transition-metal organic compound is soluble or partly soluble. As Example 1 will demonstrate, magnesium hydride obtained by homogenous catalysis can be doped in situ with $COD_2Ni$ in THF in the presence of the homogeneous hydrogenation catalyst or subsequent to separation from the catalyst and THF in another solvent like toluol for example.

The chemical processes basic to the doping method in accordance with the invention may vary according to dope, solvent, reaction conditions, and sometimes the presence of hydrogen.

There are five types of doping reaction:

a) Doping by thermal decomposition of the dissolved transition-metal complex, occurring for example when the magnesium hydride is doped with $COD_2Ni$ in toluene at 100°–110° C. (Ex. 2):

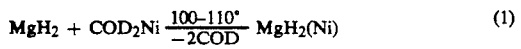

(1)

b) Doping by hydrogenation of the transition-metal complex:

Hydrogen is introduced (Ex. 9) into the suspension or solution of toluene to accelerate the doping of $MgH_2$ with $COD_2Ni$ in toluene at 20° C. The nickel complex rapidly hydrogenizes autocatalytically into cyclooctane and nickel that precipitates in an extremely fine form on the particles of $MgH_2$:

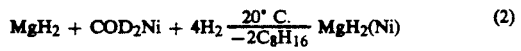

(2)

If commercially available metallic-magnesium powder is doped with a transition metal, the amount of reversibly bound hydrogen will depend also on the particle size of the powder.

Thus, there will be 3.74% by weight of reversibly bound $H_2$ when 50-mesh magnesium is employed (Ex. 4), whereas, when fine-grained (325 mesh, Ex. 10) magnesium is employed, a reversible hydrogen uptake of 6.5% by weight, relatively close to theoretical, will be attained.

c) Doping by immediate reaction of the magnesium hydride with the transition-metal organic compound:

When $MgH_2$ is doped with bis-($\eta^3$-allyl)-nickel or bis-($\eta^3$-allyl)-palladium in toluene or THF for example, the transition metal will precipitate even below room temperature, propene will form, with 70% or more of the propene calculated from the equations

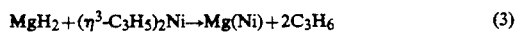

(3)

and

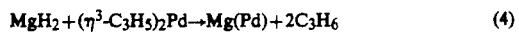

(4)

being demonstrable, and the magnesium hydride will dehydrogenize.

d) Doping by reducing the transition-metal complex with magnesium hydride:

When magnesium hydride is doped with nickel(II) complexes like bis-(acetylacetonato)- or bis-(ethylato)-nickel, it can also be exploited to reduce the divalent nickel to zero-valent nickel. In this method, however, a proportion of the magnesium hydride equivalent to the nickel(II) complex is lost as a storer because of the formation of the corresponding magnesium salt.

e) Doping by mixing finely divided magnesium and transition metal:

The magnesium can also be doped by mechanically mixing the finely divided magnesium metal with a finely divided transition metal of the IV-VIII group of the periodic system, e.g. as by milling both materials dry or in an organic solvent. The magnesium powder so doped is also extremely active in absorbing hydrogen, e.g. picking up 6.5–7.65% its weight of hydrogen at about 250°–400° C. so that it can be used in a hydrogen-storage system.

The technical advantages of the improved kinetic properties of these $MgH_2$-Mg hydrogen-storer systems derive from the hydrogen being charged more rapidly, under lower pressures, and at lower temperatures and discharged more rapidly and under lower pressures than was previously possible. This reduces material and operating costs and makes the hydrogen storers more practical and reliable to handle.

BRIEF DESCRIPTION OF THE DRAWINGS

The accompanying drawings refer together with relevant examples hereto:

FIG. 1 (Example 1) shows hydrogenation-dehydrogenation volume plotted against time for a sample doped in accordance with the invention and comparison sample, per Example 1;

FIGS. 2A and 2B (Example 1) show a set of curves of hydrogen release volume at different pressures plotted against temperature, per Example 2;

Figures 3A, 3B:
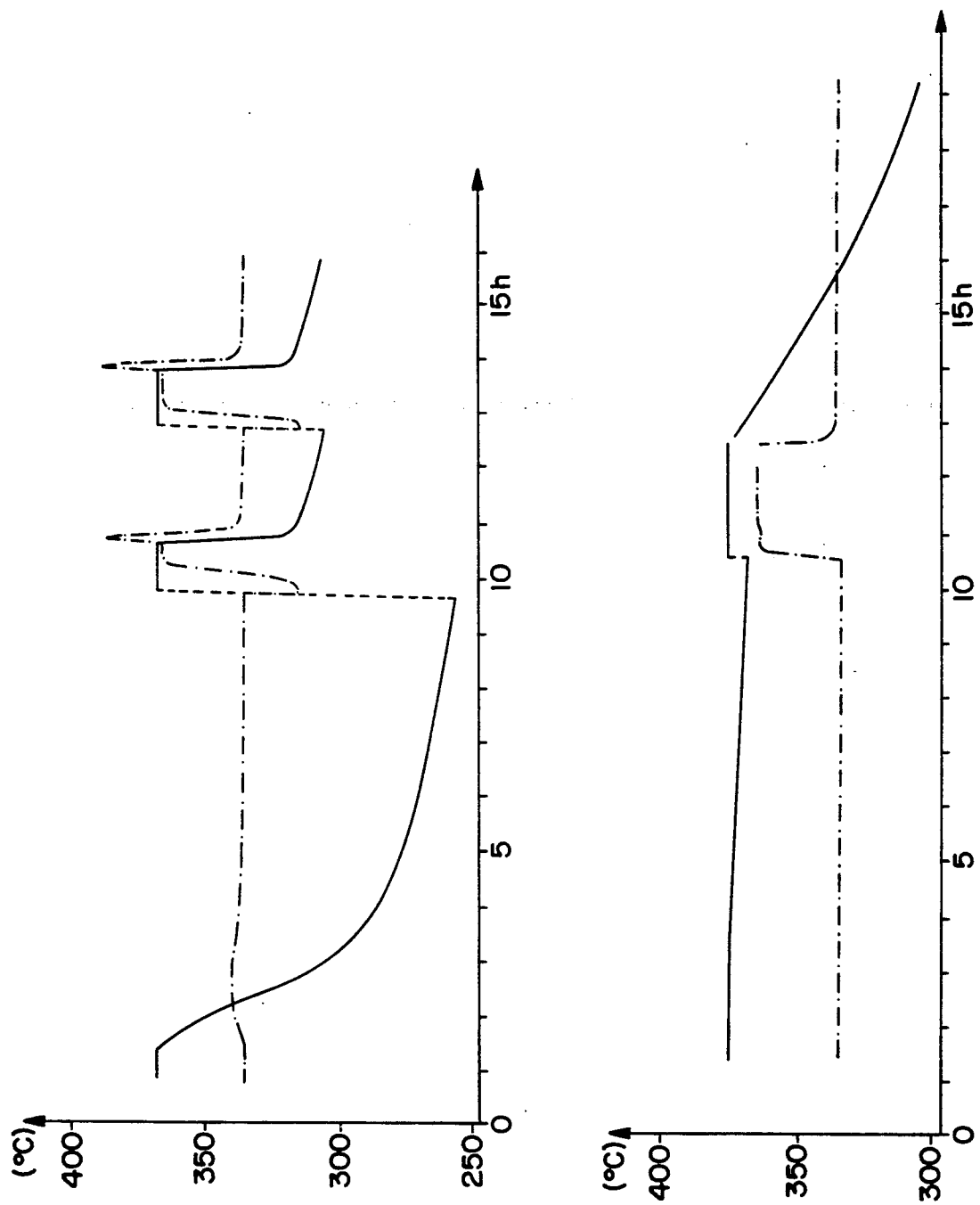
FIGS. 3A and 3B (Example 4) show a comparison of hydrogen release volume at different times and temperatures for the first 3 cycles comparing a doped sample in accordance with the invention and an undoped sample.

The invention will now be specified with reference to the following examples, without, however, being limited to them in any way.

The appropriateness of the $MgH_2$ and Mg treated by the methods specified in the examples for dehydrogenation and hydrogenation were tested by submitting samples to a) one or more cycles of dehydrogenation and hydrogenation under normal pressure ("normal-pressure test") and b) 30–40 or more cycles of dehydrogenation and hydrogenation under elevated pressure ("high-pressure test") if necessary.

The normal-pressure tests were carried out with a thermovolumetric apparatus designed for that purpose (Bogdanovic & Spliethoff, Chem.-Ing.-Tech., 55 (2) 156 1983).

To investigate the properties of the MgH$_2$ and Mg as H$_2$ storers over long-term use, the samples were subjected to a series of dehydrogenation and hydrogenation cycles under slightly elevated (15 bars max) pressure. A completely automatic and electronically controlled apparatus developed especially for this purpose was employed.

The air-sensitive MgH$_2$-Mg systems or metal complexes were tested in argon. The solvents were cleared of air and moisture and distilled in argon. Technical (99.9%) hydrogen was employed in all the tests. Fresh hydrogen was always extracted from a cylinder for the dehydrogenation and hydrogenation cycles.

EXAMPLE 1

15.0 kg (617 moles) of magnesium powder (particle size 0.3 mm, 50 mesh) were hydrogenated into magnesium hydride in 75 l of THF in a stirrer vessel by the method specified in European Patent 0 003 564 with a titanium catalyst (mole ratio of Mg:anthracene:TiCl$_4$=100:1:1) at 60°-73° C. under an H$_2$ pressure of 2 bars.

The H$_2$ atmosphere of the vessel was replaced with an argon atmosphere for doping with nickel. 1.4 kg (5 moles) of solid COD$_2$Ni were added to the in situ suspension of MgH$_2$ in THF under the argon. The suspension was heated to 100° C. for 4 hours while stirred. The magnesium hydride, doped with nickel, was filtered out, washed with THF and pentane, and dried in a vacuum (0.2–0.4 mbars). The product was subjected to one cycle of dehydrogenation and hydrogenation (dehydrogenation at 230°–370° C. under 10–0.4 mbars and hydrogenation at 335°–350° C. under 5–10 bars) to clear it of organic residue. 14.0 kg of magnesium hydride were obtained in the form of a light gray pyrophoric powder composed of C 0.0, H 6.01, Mg 85.17, Ti 1.51, Cl 2.72, and Ni 0.89.

Normal-Pressure Test

A 0.72-g sample of the product was dehydrogenated in a (1-bar) H$_2$ atmosphere at 334° C. and then hydrogenated at 230° C. (both temperatures furnace temperatures) in the thermovolumetric apparatus. Curves b in FIG. 1 represent the dehydrogenation and hydrogenation cycle.

Curves a in FIG. 1 represent in comparison a dehydrogenation cycle for a (0.69-g) sample prepared by the same (titanium catalyst) method but not doped (dehydrogenation at 329° C. under 1 bar and hydrogenation at 230° C. under 1 bar).

Comparison with the undoped MgH$_2$ sample shows that doping with nickel considerably improves not only the dehydrogenation kinetics but also the hydrogenation of the resulting magnesium. The dehydrogenation and hydrogenation cycles can be repeated several times under normal pressure with the doped MgH$_2$ sample and will indicate only minimum losses of H$_2$-storage capacity.

High-Pressure Test

A 19.09-g sample of the nickel-doped magnesium hydride was subjected to a series of 42 dehydrogenation and hydrogenation cycles at various hydrogenation pressures and times (t$_h$). The external dehydrogenation temperature (T$_d$) was always 367° C. and the external hydrogenation temperature (T$_h$) always 267° C. Table I lists the results of the high-pressure test. FIG. 2 illustrates typical curves of hydrogen release and uptake for cycles carried out under 10, 5, 3, and 2 bars of H$_2$ pressure along with the associated sample-temperature curves. For comparison, a 34-cycle high-pressure test of a (17.34-g) sample of magnesium hydride prepared with a titanium catalyst but not doped was carried out under the same conditions. Table Ia lists the results and FIG. 2B, illustrates curves for typical cycles.

The results of these two tests reveal that samples of both the doped and the undoped MgH$_2$ prepared by homogeneous catalysis make appropriate reversible hydrogen storers under low H$_2$ pressures (2–10 bars). Both H$_2$-storage capacity and kinetics remain practically constant subject to measurement error for 42 and 34 cycles under these conditions.

Nevertheless, there were distinct differences in kinetics in favor of the doped sample (FIGS. 2A, and 2B). The hydrogenation curves for low pressure (2 and 3 bars) reveal the greatest differences, with the hydrogenation times of the doped samples being at least 3 times shorter.

The slighter differences in hydrogenation under higher pressures result from heat transport becoming more and more significant as the rate-determining factor as hydrogenation becomes more rapid.

TABLE 1

| Cycle No. | Dehydrogation H$_2$ [l] | Hydrogenation Pressure [bars]$^{a)}$ | Hydrogenation Time t$_h$ [hours] | H$_2$ [l] | Cycle No. | Dehydrogenation H$_2$ [l] | Hydrogenation Pressure [bars]$^{a)}$ | Hydrogenation Time t$_h$ [hours] | H$_2$ [l] |
|---|---|---|---|---|---|---|---|---|---|
| Results of high-pressure test of MgH$_2$ sample doped with 0.89% nickel (Ex. 1). T$_d$ = 367° C., T$_h$ = 267° C., t$_d$ = 1.5. | | | | | | | | | |
| 1 | 13.7 | 10 | 2 | 14.8 | 22 | 14.9 | 3 | 2 | 14.5 |
| 2 | 14.8 | " | " | " | 23 | 15.0 | " | " | " |
| 3 | " | " | " | " | 24 | " | " | " | 14.4 |
| 4 | 14.7 | " | " | 14.6 | 25$^{b)}$ | " | " | " | 14.5 |
| 5$^{b)}$ | 14.6 | " | " | 14.5 | 26 | " | " | " | " |
| 6 | " | " | " | " | 27 | 14.9 | " | " | 14.4 |
| 7 | " | 2 | 3 | 14.4 | 28 | 15.0 | " | " | 14.5 |
| 8 | 14.7 | " | " | " | 29 | " | " | " | " |
| 9 | " | " | " | " | 30 | 15.1 | " | " | 14.6 |
| 10$^{b)}$ | 14.6 | " | " | " | 31 | 15.0 | " | " | 14.7 |
| 11 | " | " | " | " | 32 | 15.1 | " | " | " |
| 12 | 14.5 | 5 | 1.5 | " | 33 | 15.0 | " | " | " |
| 13 | 14.7 | " | " | 14.5 | 34 | " | 5 | 1.5 | 14.9 |
| 14 | 14.8 | " | " | " | 35 | 14.9 | " | " | " |
| 15$^{b)}$ | 14.7 | " | " | " | 36 | " | " | " | 15.0 |

TABLE 1-continued

| Cycle No. | Dehydrogation H₂ [l] | Hydrogenation Pressure [bars]ᵃ⁾ | Hydrogenation Time t_h [hours] | H₂ [l] | Cycle No. | Dehydrogenation H₂ [l] | Hydrogenation Pressure [bars]ᵃ⁾ | Hydrogenation Time t_h [hours] | H₂ [l] |
|---|---|---|---|---|---|---|---|---|---|
| 16 | 14.6 | " | " | 14.4 | 37 | 15.0 | " | " | 14.9 |
| 17 | 14.7 | 3 | 2 | 14.5 | 38 | " | " | " | " |
| 18 | " | " | " | " | 39 | 14.9 | " | " | " |
| 19 | 14.8 | " | " | " | 40 | 15.1 | " | " | 15.0 |
| 20 | " | " | " | " | 41 | 14.9 | " | " | " |
| 21 | " | " | " | " | 42 | " | " | " | "ᶜ⁾ |

ᵃ⁾0 bars = atmospheric pressure.
ᵇ⁾FIG. 2A, illustrates these cycles.
ᶜ⁾Reversible H₂ level after 42 cycles: 6.60% by weight. Yield: 19.09 g.

Results of high-pressure test of an undoped sample of MgH₂ (Ex. 1). $T_d = 367°$ C., $T_h = 267°$ C., $t_d$ = hours.

| 1 | 14.0 | 10 | 1 | 14.3 | 18 | 13.4 | 3.5 | 4.5 | 13.8 |
|---|---|---|---|---|---|---|---|---|---|
| 2 | 13.6 | " | 1.5 | 14.4 | 19 | " | 10 | 2.5 | 15.0 |
| 3 | 13.5 | " | 2 | " | 20 | " | 3 | 5 | 14.0 |
| 4ᵇ⁾ | 13.6 | " | " | 14.5 | 21 | 13.3 | " | " | 13.8 |
| 5 | " | " | " | " | 22 | 13.2 | " | " | 13.6 |
| 6 | " | 5 | ' | 14.0 | 23 | " | " | " | 13.7 |
| 7 | " | " | " | 14.1 | 24 | " | " | " | " |
| 8ᵇ⁾ | " | " | " | " | 25 | 13.2 | " | " | 13.6 |
| 9 | 13.7 | " | " | 14.0 | 26ᵇ⁾ | 13.0 | " | " | " |
| 10 | 13.6 | " | " | 13.9 | 27 | " | " | " | 13.8 |
| 11 | " | " | " | " | 28 | 12.9 | " | " | 13.6 |
| 12 | " | 2 | 6 | 13.6 | 29 | " | " | " | 13.7 |
| 13ᵇ⁾ | 13.3 | " | " | " | 30 | " | 10 | 2 | —ᶜ⁾ |
| 14 | " | " | " | 13.5 | 31 | 13.3 | " | " | — |
| 15 | 13.4 | 3.5 | 4.5 | 14.1 | 32 | " | " | " | — |
| 16 | 13.5 | " | " | " | 33 | " | " | " | — |
| 17 | 13.4 | " | " | 14.0 | 34 | " | " | " | —ᵈ⁾ |

ᵃ⁾0 bars = atmospheric pressure.
ᵇ⁾FIG. 2B, illustrates these cycles.
ᶜ⁾Not measured.
ᵈ⁾Reversible H₂ level after 34 cycles: 6.93% by weight. Yield: 16.13 g.

EXAMPLE 2

218.7 g (0.9 moles) of magnesium powder (particle size 0.3 mm, 50 mesh) were hydrogenated into magnesium hydride in 1.1 l of THF by the method specified in European Patent 0 003 564 with a chromium catalyst (mole ratio of Mg:anthracene:$CrCl_3$ = 100:1:1) at 60° C. under a pressure of 20 bars. The product was filtered out, washed with THF and pentane, and dried in a (0.2-bar) vacuum at room temperature to constant weight. The yield was 252.2 g of $MgH_2$ composed of C 4.4, H 7.0, Mg 84.2, Cr 0.75 and Cl 2.04%.

Four samples (a-d) weighing 21-23 g of this magnesium hydride were each suspended in 300 ml of toluene. The toluene suspension was treated with various amounts of solid $COD_2Ni$ (Table II). The batches were then stirred for 15 hours at 100° C. The doped $MgH_2$ samples were filtered out, washed with toluene and pentane, and dried in a (0.2-mbar) vacuum. A sample of undoped $MgH_2$ was thermally treated in toluene at 100° C. in the same way but without the addition of $COD_2Ni$.

described in Example 1. The results of the normal-pressure test show that considerable improvement in hydrogenation kinetics can be achieved even at a dose of 0.8% nickel (Sample c). Doping with more nickel (Sample a or b) leads to only inconsiderable further improvement in the hydrogenation kinetics.

NORMAL-PRESSURE TEST AT VARIOUS TEMPERATURES 0.79 g of Sample b (with 3.3% nickel) and 0.65 g of Sample e, which had not been doped with nickel, were dehydrogenated under normal pressure at 330° C. The resulting samples of "active magnesium" were hydrogenated at the temperature range of 100°-283° C. and under 1 bar of $H_2$ pressure. As the results of this test indicates, both samples can be hydrogenated at an impressive rate at as low as 150° C. Hydrogenation rates increase with temperature, reaching a maximum at 250°-255° C. for both samples. As temperature continues to rise the hydrogenation rates naturally drop because the systems are approaching equilibrium (285° C., 1 bar). Comparison of both samples indicates that the

TABLE 2

| | Doping MgH₂ with COD₂Ni in toluene at 100° C. | | | | | | | | | |
|---|---|---|---|---|---|---|---|---|---|---|
| Sample | MgH₂ [g] | COD₂Ni [g] | Doped MgH₂ [g] | Ni %ᵃ⁾ calc. | Composition of doped samples [%] | | | | | |
| | | | | | Ni | C | H | Mg | Cl | Cr |
| a | 22.4 | 15.0 | 20.2 | 12.5 | 12.8 | 6.0 | 6.1 | 73.5 | 0.46 | ᵇ⁾ |
| b | 21.7 | 3.3 | 21.6 | 3.1 | 3.3 | 5.6 | 6.5 | 83.5 | 0.42 | ᵇ⁾ |
| c | 21.2 | 0.74 | 20.8 | 0.7 | 0.8 | 4.9 | 6.9 | 85.4 | 0.39 | ᵇ⁾ |
| d | 23.0 | 0.08 | 22.3 | 0.07 | 0.07 | 4.8 | 7.0 | 87.2 | 0.31 | ᵇ⁾ |

ᵃ⁾At 100% doping.
ᵇ⁾Not determined.

NORMAL-PRESSURE TEST $MgH_2$ Samples a-d, doped with nickel, were subjected to the dehydrogenation and hydrogenation cycle doped sample exhibits considerably better hydrogenation kinetics throughout the tested temperature range.

"Ignition tests" were conducted with a nickel-doped sample of "active magnesium" under various $H_2$ pressures. Sample b (3.3% nickel) was dehydrogenated at 330° C. and under 1 bar. Portions of 11.0 g of the resulting "active magnesium" were hydrogenated in a 300-ml autoclave at various $H_2$ pressures. The autoclave was heated up at a constant rate of 2° C./min and the temperature inside each sample measured. At pressures of 10 and 15 bars the "ignition temperature" of the sample was about 150° C. During the next 30 minutes the sample heated up briefly to 380°-390° C. as the result of hydrogenation heat, and after another 10 minutes the hydrogenation process was practically complete. At lower $H_2$ pressures (0.7 and 2 bars) the ignition temperature was naturally higher (190°-200° C.). A maximum temperature of 270°-290° C. was attained during hydrogenation. Maximum attainable hydrogenation temperature can, because it can not exceed the equilibrium temperature corresponding to the $H_2$ pressure, accordingly be controlled ahead of time by setting a given $H_2$ pressure.

EXAMPLE 3

72.3 g (3.0 moles) of powdered magnesium (particle size, 0.3 mm, 50 mesh) were hydrogenated into magnesium hydride in 0.35 l of THF by the method specified in European Patent 0 003 564 with a titanium catalyst (mole ratio of Mg:anthracene:$TiCl_4$=200:1:1) at 60° C. under a pressure of 80 bars. The product was filtered out, washed with THF and pentane, and dried in a high vacuum at room temperature to constant weight. The yield was 252.2 g of a product composed of C 3.09, H 7.40, Mg 84.2, Mg 86.86, Ti 0.59, and Cl 1.42% (Sample f).

An 11.35-g sample of the resulting magnesium hydride was suspended in 100 ml of toluene. The suspension was treated with 0.90 g of $COD_2Ni$ and stirred for 5 hours at 100° C. The doped magnesium hydride was filtered out, washed with toluene and pentane, and dried in a high vacuum at room temperature. The yield was 11.18 g of a product composed of C 2.90, H 6.79, Mg 86.10, Ni 1.54, Ti 0.59, and Cl 1.01% (Sample g).

Normal-Pressure Test

The results of the normal-pressure test show that the doped sample (Sample g) had considerably better $H_2$-storer properties with respect not only to kinetics but also to reversibility than the undoped sample (Sample f). Subsequent to 2-3 cycles of dehydrogenation and hydrogenation the amount of $H_2$ released at 330° C. had been completely recaptured at 230° C.

EXAMPLE 4

300.0 g (12.3 moles) of powdered magnesium (particle size 0.3 mm, 50 mesh) were heated in a vacuum and suspended in 1 l of toluene. The suspension was treated with 27.7 g (0.1 mole) of $COD_2Ni$. Hydrogen was introduced at room temperature and under 1 bar into the yellow toluene solution while stirred and with the magnesium powder suspended in it until it lost color (about 2 hours). The doped magnesium powder was filtered out, washed with pentane, and dried in a vacuum. The yield was 304.2 g of powdered magnesium doped with 2% nickel.

High-Pressure Test

A 15.0-g sample of the nickel-doped magnesium powder was subject to a series of 66 dehydrogenation and hydrogenation cycles varying in pressure, temperature ($T_h$), and time ($t_h$). The autoclave dehydrogenation temperature ($T_d$) was always 366° C. and the dehydrogenation time ($t_d$) 1 hour. Table 3 shows the results of the test.

TABLE 3

Results of high-pressure test of powdered magnesium sample doped with 2% nickel.
$T_d = 366°$ C., $t_d = 1$ hour.

| Cycle No. | $T_h$ [°C.] | Hydrogenation Pressure [bars][a) | $t_h$ [hours] | Dehydrog. $H_2$ [l][b) | $H_2$ [l][b) |
|---|---|---|---|---|---|
| 1 | 338 | 15 | 9 | 9.6 | 8.8 |
| 2-4 | " | " | 2 | 5.4 | 4.5 |
| 5-6 | 264 | " | 1 | — | " |
| 7-41 | 338 | " | " | 6.4 | 5.7 |
| 42-54 | 264 | " | " | 6.1 | 5.8 |
| 55-60 | " | 5 | 2 | 6.5 | 6.6 |
| 61-62 | " | 15 | 1 | 5.6 | 5.7 |
| 63 | " | " | 3 | — | 5.8 |
| 64-65 | 338 | " | 6 | 8.1 | 7.6 |
| 66 | " | " | 2 | 6.3[c) | |

[a) 0 bars = atmospheric pressure
[b) 20° C. under 1 bar
[c) 15.6 g of $MgH_2$ with 3.74% by weight of $H_2$ weighed out (subsequent to normal-pressure test).

Figure 4A:
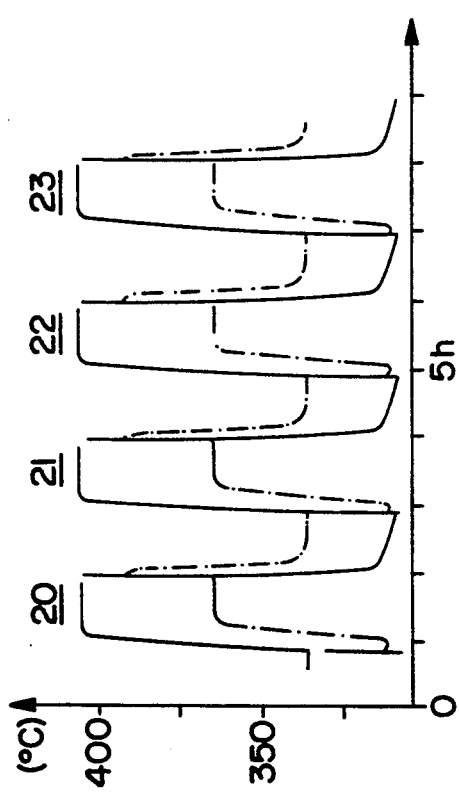
FIGS. 4A and 4B are similar to FIGS. 3A and 3B (Example 4) for cycles 20–30.
Figure 4B:
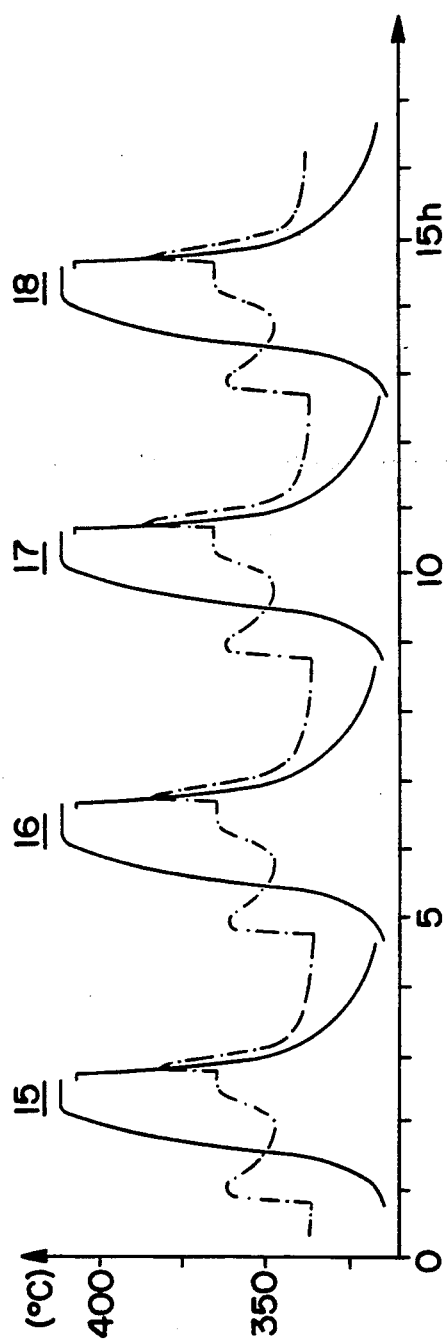
Figure 5A:
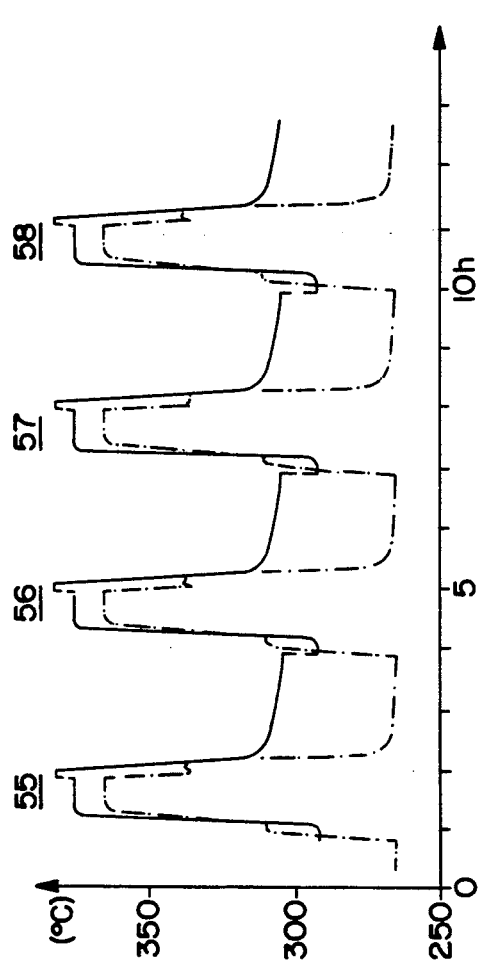
FIGS. 5A and 5B are similar to FIGS. 3A and 3B (Example 4) for cycles 55–58.
Figure 5B:
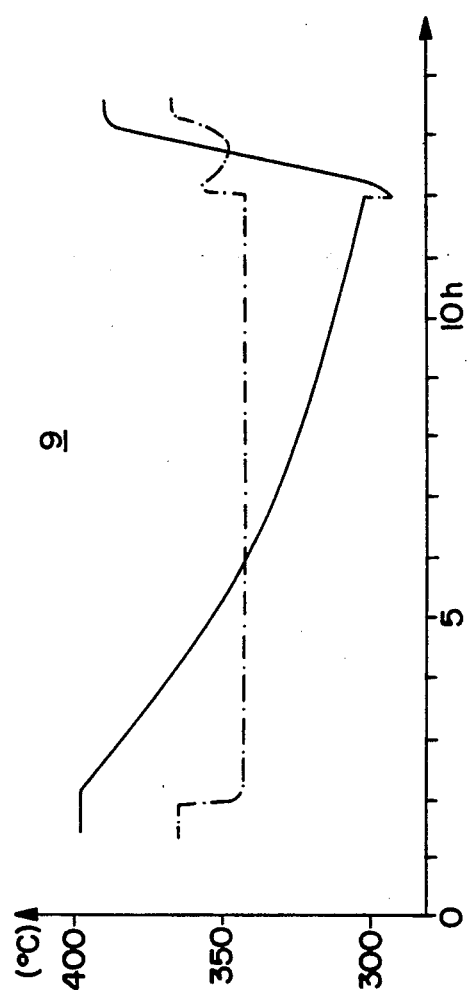

FIG. 3A, illustrates the course of hydrogenation during the first three cycles and FIG. 4A, during dehydrogenation and hydrogenation cycles 20-23 at a hydrogenation temperature of 338° C. and an $H_2$ pressure of 15 bars. The two figures also show the associated sample-temperature curves. FIG. 5A, shows the same curves for the same sample during cycles 55-58 at a hydrogenation temperature of 264° C. and a pressure of 5 bars. For comparison a high-pressure test lasting 31 cycles was carried out under similar conditions with a 15.1 g sample of undoped magnesium powder (manufactured by Ventron, 50 mesh). Table 3a and FIGS. 3B, 4B, and 5B, show the results.

Comparison of the curves in FIGS. 3A, 3B, 4A, 4B, 5A and 5B, indicates drastic differences in the kinetic behavior of the two samples in favor of the nickel-doped sample. These differences are extremely clear in both the initial (FIGS. 3A and 3B) and subsequent (FIGS. 4A and 4B) dehydrogenation and hydrogenation cycles. Particularly remarkable differences in hydrogenation kinetics in favor of the doped sample appear under lower pressures (5 bars, FIGS. 5A and 5B), with the doped sample exhibiting especially superior kinetics in spite of the lower external temperature.

TABLE 3a

Results of high-pressure test of undoped powdered-magnesium sample (Example 4).
$T_h = 338°$ C., $T_d = 366°$ C., $t_d = 2$ hours.

| Cycle No. | Hydrogenation Pressure [bars][a) | $t_h$ [hours] | $H_2$ [l][b) | Dehydrog. $H_2$ [l][b) |
|---|---|---|---|---|
| 1 | 15 | 9 | — | 0.2 |
| 2 | " | 7 | 6.2 | 5.8 |
| 3 | " | 2 | 4.8 | 4.9 |
| 4 | " | " | 5.5 | 5.3 |
| 5 | " | " | 5.9 | 5.9 |
| 6 | " | " | 6.2 | 6.4 |
| 7 | " | " | 6.4 | 6.5 |
| 8 | " | " | 6.6 | 6.7 |
| 9 | 5 | 10 | 8.0 | 8.1 |
| 10 | " | " | 8.4 | 8.2 |
| 11-31 | 15 | 2 | 7.4-8.1 | 7.3-8.1 |

[a) 0 bars = atmospheric pressure
[b) 20° C. under 1 bar

EXAMPLE 5

1.79 g of nickel tetracarbonyl in 5 ml of toluene were added to 19.2 g of (undoped) magnesium hydride prepared as in Example 2 in 200 ml of toluene, which was then heated for 8 hours to 100° C. (reflux coil: acetone and dry ice). The suspension was filtered and the doped magnesium hydride washed with toluene and pentane and dried in a vacuum (0.2 mbars). The yield was 20.0 g of a product composed of C 6.03, H 6.48, Mg 80.60, Ni 2.60, and Cl 1.11%.

The resulting $MgH_2$ sample exhibited improved kinetic properties in the normal-pressure test in comparison with the undoped sample.

EXAMPLE 6

24.0 (1.0 moles) of powdered magnesium (particle size: 0.3 mm, 50 mesh) were hydrogenated into magnesium hydride in 150 ml of THF by the method specified in European Patent 0 003 564 with a chromium catalyst (mole ratio of Mg:anthracene:$CrCl_3$ = 100:1:1) at 20°–24° C. under a pressure of 80–100 bars. The product was filtered out, washed with THF and pentane, and dried in a high vacuum at room temperature to constant weight. The yield was 27.0 g of $MgH_2$ composed of C 6.66, H 6.64, Mg 82.64, Cr 1.21 and Cl 2.95% (Sample h).

1.19 g of Sample h were placed in a 25 ml flask connected to a cold trap and provided with a dropping funnel. The apparatus was evacuated. A solution of 0.42 g (3.30 mmoles) of bis-($\eta^3$-allyl)-nickel in 4.0 m of toluene was added from the funnel to the sample while it was being stirred at room temperature. The resulting gases were condensed in the cold trap (liquid $N_2$). After allowing the reaction to occur for 2.5 hours, the cold trap was defrosted, yielding 60 ml of gas (20° C. and 1 bar) consisting of 98.5% propene and 1.5% propane (mole %, mass spectrography). After another 60 hours of reaction at room temperature the formation of another 43 ml (20° C. and 1 bar) consisting of 95.9% propene and 4.0% propane was demonstrated. On the whole, 70% of the allyl groups were determined to be propene, 11.4% propane, and 0.4% hexadiene-1,5 in the reaction of $MgH_2$ with bis-($\eta^3$-allyl)-nickel. The solvent (toluene) was evaporated out in a vacuum and the residue dried in a high vacuum at room temperature. The product was composed of C 9.09, H 6.11, Mg 69.94, Ni 12.90, Cr 0.53, and Cl 1.20%.

The resulting nickel-doped $MgH_2$ sample exhibited improved kinetic properties in comparison with the undoped sample (Sample h) in the normal-pressure test.

EXAMPLE 7

1.38 g of the $MgH_2$ Sample h (Ex. 6) were doped as in Example 6 with 0.39 g (2.1 mmoles) of bis-($\eta^3$-allyl)-palladium at room temperature. 72.6% of the allyl groups in this reaction were determined to be propene, 1.2% propane, and 2.4% hexadiene-1,5. The palladium-doped magnesium hydride was composed of C 6.34, H 5.90, Mg 72.88, Pd 13.07, Cr 0.47, and Cl 1.13%.

The palladium-doped $MgH_2$ sample exhibited improved kinetic properties in comparison with the undoped sample (Sample h) in the normal-pressure test.

EXAMPLE 8

2.59 g of $MgH_2$ Sample h (Ex. 6) were suspended in 20 ml of toluene and treated at −78° C. with a −78° C. solution of 0.22 g (1.25 mmoles) of tris-($\eta^3$-allyl)-iron in 20 ml of toluene. The temperature of the mixture was allowed while stirred to rise from −78° C. to −6° C. within 8 hours. It was then stirred at room temperature for 24 hours. The iron-doped $MgH_2$ was filtered out, washed with toluene and pentane, and dried in a high vacuum. The iron-doped magnesium hydride was composed of C 9.45, H 7.13, Mg 78.19, Fe 1.98, Cr 0.45, and Cl 2.56%.

The iron-doped $MgH_2$ sample exhibited improved kinetic properties in comparison with the undoped sample (Sample h) in the normal-pressure test.

EXAMPLE 9

1.86 g (6.8 mmoles) of $COD_2Ni$ were added to 19.45 g of magnesium hydride (mf. by Alpha Products) in 100 ml of toluene. Hydrogen (1 bar) was introduced into the solution or suspension while the latter was stirred at room temperature. After 630 ml of $H_2$ (20° C. and 1 bar), (649 ml calculated for the hydrogenation of the $COD_2Ni$) were taken up within 1.6 hours, hydrogen takeup was significantly slower. During the next 2.5 hours 230 ml of $H_2$ (20° C. and 1 bar) were taken up (hydrogenation of toluene), after which hydrogenation was interrupted. The suspension was filtered out and the doped magnesium hydride washed with toluene and pentane and dried in a high vacuum. The yield was 19.90 g of a product composed of C 0.39, H 4.95, Mg 84.02, and Ni 1.89%.

The doped $MgH_2$ sample exhibited considerably improved kinetic properties in comparison with the undoped sample (from Alpha Products) in the high-pressure and normal-pressure tests.

EXAMPLE 10

50.0 g (2.06 moles) of powdered magnesium (Alpha Products, 325 mesh) were suspended in 150 m of toluene. The suspension was treated with 4.77 g (17.4 mmoles) of $COD_2Ni$. Hydrogen (1 bar) was introduced at room temperature from an automatically recording gas burette (*Chem. Ing. Techn.*, loc. cit.) into the yellow toluene solution while it was being stirred and with the magnesium powder suspended in it until there was a sharp kink in the hydrogen-uptake curve subsequent to the uptake of 1.70 l of $H_2$ (20° C. and 1 bar, 102% of th.). Hydrogenation took 1 hour. The doped magnesium powder was filtered out, washed with pentane, and dried in a vacuum. The yield was 50.5 g of nickel-doped magnesium powder.

High-Pressure Test

A sample of 14.7 g of the resulting magnesium powder was subjected to a series of 35 hydrogenation and dehydrogenation cycles at different hydrogenation pressures and times ($t_h$). Dehydrogenation autoclave temperature ($T_d$) was 362° C. and hydrogenation autoclave temperature ($T_h$) 264° C. The dehydrogenation time ($t_d$) was a constant 1 hour. Except for the first hydrogenation, which was carried out at 337° C. and lasted about 4 hours, "effective hydrogenation times" (the time until the active magnesium practically stopped taking up $H_2$) were 1.2 hours at 1 bar, 0.9 hours at 2 bars, 0.8 hours at 3 bars, 0.6 hours at 5 bars, and 0.4 hours at 15 bars (excess $H_2$ pressure), with the temperature inside the sample always increasing to the equilibrium temperature corresponding to the given $H_2$ pressure. The effective dehydrogenation times were 0.6 hours, with the temperature inside the sample falling below 300° C. The reversible hydrogen content varied in accordance with hydrogenation pressure and time during the cycles of hydrogenation and dehydrogenation between 11.3 l, corresponding to 6.0% by weight, and 12.6 l, corresponding to 6.6% by weight of $MgH_2$ (20° C. and 1 bar). A high-pressure test lasting 22 cycles was also conducted under the same conditions with a sample of 15.0 g of undoped powdered magesium (Alfa Products, 325 mesh). Comparison of the two tests demonstrated drastic differences in the kinetic behavior of the two samples in favor of the nickel-doped sample. The first hydrogenation of the doped sample was at least 3 times faster and subsequent hydrogenations, at 5 and 3 bars, at least 10 and 15 times faster respectively than the hydrogenations of the undoped sample. The reversible hydrogen content of the undoped sample ranged from 6.3 to 6.8% by weight of $MgH_2$ in accordance with hydrogenation pressure and time.

EXAMPLE 11

29.4 g magnesium powder (270 mesh, origin: Hoechst) and 0,6 g nickel powder (Inco Co.) in 200 ml toluene were milled for 16 hours in a glass ball mill under argon. The metal powder was filtered, washed with pentane and dried in vacuum (0.2 mbar). 27.3 g of a non-pyrophoric magnesium powder doped with about 2 weight-% nickel were isolated in this manner.

For the application as hydrogen-storage material 16.2 g of this powder were hydrogenated during 21 hours at 266° C. and a 5 bar hydrogen pressure and thereafter dehydrogenated at 344° C. yielding 8.2 l $H_2$ calculated at 20° C. and 1 bar. The cycle of hydrogenation and dehydrogenation was repeated once more except that hydrogenation lasted only 3 hours. During the following 32 hydrogenation-dehydrogenation cycles (4 cycles at 15 bar, 10 cycles at 3 bar, 7 cycles at 1 bar, 6 cycles at 5 bar, and 5 cycles at 10 bar) hydrogenation was effected at 260° C., dehydrogenation at 349° C., the times being 2 hours for each hydrogenation and 1.5 hours for each dehydrogenation. The kinetics during these cycles were practically unchanged. After the last dehydrogenation 7% of hydrogen, based on the weight of the magnesium hydride, was released.

It will be understood that the specification and examples are illustrative but not limitative of the present invention and that other embodiments within the spirit and scope of the invention will suggest themselves to those skilled in the art.

I claim:

1. A finely divided magnesium powder composition consisting essentially of 96–99% by weight of finely divided magnesium powder and 1–4% of one transition metal of groups IV–VIII of the Periodic Table, said composition being capable of reversibly sorbing hydrogen in an amount of 6.5–7.65% by weight at about 250°–400° C.

2. Magnesium according to claim 1, produced by contacting the magnesium and transition metal dry.

3. Magnesium according to claim 1, produced by contacting the magnesium and transition metal in an organic liquid.

4. Magnesium according to claim 1, wherein the transition metal consists essentially of nickel.

* * * * *